United States Patent
Xu et al.

(10) Patent No.: US 11,308,674 B2
(45) Date of Patent: Apr. 19, 2022

(54) DYNAMIC IMAGE COMPOSITING METHOD AND APPARATUS, TERMINAL AND STORAGE MEDIUM

(71) Applicant: Tencent Technology (Shenzhen) Company Limited, Shenzhen (CN)

(72) Inventors: Yi Xu, Shenzhen (CN); Qifa Guo, Shenzhen (CN); Shengwei Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 199 days.

(21) Appl. No.: 16/799,640

(22) Filed: Feb. 24, 2020

(65) Prior Publication Data
US 2020/0193670 A1 Jun. 18, 2020

Related U.S. Application Data

(63) Continuation of application No. PCT/CN2018/105961, filed on Sep. 17, 2018.

(30) Foreign Application Priority Data

Sep. 30, 2017 (CN) .......................... 201710922942.9

(51) Int. Cl.
G06T 13/40 (2011.01)
G06T 11/60 (2006.01)
G06T 13/80 (2011.01)

(52) U.S. Cl.
CPC .............. *G06T 13/40* (2013.01); *G06T 11/60* (2013.01); *G06T 13/80* (2013.01); *G06T 2200/24* (2013.01); *G06T 2207/20221* (2013.01)

(58) Field of Classification Search
None
See application file for complete search history.

(56) References Cited

U.S. PATENT DOCUMENTS 7,039,569 B1 * 5/2006 Haws ...................... G06F 30/13
703/7
2009/0059058 A1 * 3/2009 Okabe .............. H04N 5/232123
348/345

(Continued)

FOREIGN PATENT DOCUMENTS

CN 1971622 A 5/2007
CN 101232598 A 7/2008
(Continued)

OTHER PUBLICATIONS

Spade, "HowTo Use Snapchat Animated Bitmoji", Sep. 19, 2017, URL: https://www.youtube.com/watch?v=dyasa1LDml8 (Year: 2017).*

(Continued)

*Primary Examiner* — David H Chu
(74) *Attorney, Agent, or Firm* — Morgan, Lewis & Bockius LLP

(57) ABSTRACT

Embodiments of this application disclose a dynamic image compositing method performed at a terminal. A skeleton animation of an animation model is displayed on a real-world image captured by the terminal; a currently displayed target real-world image is captured in a case that a photographing instruction is received, and the skeleton animation of the animation model is recorded, to obtain the recorded skeleton animation; image compositing is performed on the target real-world image and each frame of image of the recorded skeleton animation, to obtain a plurality of composited images; and the plurality of composited images are combined into a corresponding dynamic image. Based on the solutions, the real-world image and the skeleton animation of the animation model may be automatically compos- (Continued)

ited into the corresponding dynamic image, and a user does not need to perform a large quantity of repetitive image addition and selection operations.

20 Claims, 11 Drawing Sheets

(56) References Cited

U.S. PATENT DOCUMENTS

| | | | | |
|---|---|---|---|---|
| 2009/0204880 A1* | 8/2009 | Ko | ............ | G09B 5/062 |
| | | | | 715/202 |
| 2013/0063418 A1* | 3/2013 | Kaschalk | ............ | G06T 13/20 |
| | | | | 345/419 |
| 2015/0149883 A1* | 5/2015 | Masuko | ............ | G06T 11/00 |
| | | | | 715/232 |
| 2016/0267942 A1* | 9/2016 | Fisher | ............ | G06T 13/80 |
| 2017/0064208 A1* | 3/2017 | Salimpour | ....... | H04N 5/232935 |

FOREIGN PATENT DOCUMENTS

| | | |
|---|---|---|
| CN | 102915551 A | 2/2013 |
| CN | 105704507 A | 6/2016 |
| JP | 2013126163 A | 6/2013 |
| KR | 20170011065 A | 2/2017 |
| WO | WO 0193207 A1 | 12/2001 |

OTHER PUBLICATIONS

Pollard, "How to Animate Text in Snapchat Update 9 38 0 0", Sep. 6, 2016, URL: https://www.youtube.com/watch?v=fOiN_QcFE6c (Year: 2016).*

Tencent Technology, ISRWO, PCT/CN2018/105961, Dec. 19, 2018, 6 pages.

Tencent Technology, IPRP, PCT/CN2018/105961, Mar. 31, 2020, 5 pages.

* cited by examiner

DYNAMIC IMAGE COMPOSITING METHOD AND APPARATUS, TERMINAL AND STORAGE MEDIUM

CROSS-REFERENCE TO RELATED APPLICATIONS

This application is a continuation application of PCT/CN2018/105961, entitled "DYNAMIC IMAGE COMPOSITING METHOD AND APPARATUS, TERMINAL AND STORAGE MEDIUM" filed on Sep. 17, 2018, which claims priority to Chinese Patent Application No. 201710922942.9, entitled "DYNAMIC IMAGE COMPOSITING METHOD AND APPARATUS, TERMINAL AND STORAGE MEDIUM" and filed with the Chinese Patent Office on Sep. 30, 2017, all of which are incorporated by reference in their entirety.

FIELD OF THE TECHNOLOGY

Embodiments of this application relate to the field of picture processing technologies, and specifically to a dynamic image compositing method and apparatus, a terminal and a storage medium.

BACKGROUND OF THE DISCLOSURE

Currently, some applications provide an image compositing function. For example, a user invokes a camera through a photographing application to capture a photograph. After photographing, a terminal jumps to an image editing page, selects, according to a selection operation of the user, an image that needs to be added, and then composites the captured photograph and the selected image, to obtain a new image.

SUMMARY

Embodiments of this application provide a dynamic image compositing method and apparatus, a terminal and a storage medium, which can improve compositing efficiency of a dynamic image.

An embodiment of this application provides a dynamic image compositing method performed at a terminal having one or more processors and memory storing a plurality of programs to be executed by the one or more processors, the method comprising:
  displaying a skeleton animation of an animation model on a real-world image captured by the terminal;
  receiving a photographing instruction;
  in response to the photographing instruction:
  capturing a currently displayed target real-world image and recording the skeleton animation of the animation model, the recorded skeleton animation including a plurality of image frames;
  performing image composition on the target real-world image and the plurality of image frames, to obtain a plurality of composited images, each composited image having the target real-world image as its background; and
  combining the plurality of composited images into a dynamic image animation.

Correspondingly, an embodiment of this application further provides a terminal comprising one or more processors, memory coupled to the one or more processors and a plurality of programs stored in the memory that, when executed by the one or more processors, cause the terminal to perform the aforementioned dynamic image compositing method.

Correspondingly, an embodiment of this application further provides a non-transitory computer readable storage medium storing a plurality of machine readable instructions in connection with a terminal having one or more processors. The plurality of machine readable instructions, when executed by the one or more processors, cause the terminal to perform the aforementioned dynamic image compositing method.

In the embodiments of this application, a real-world image captured by a terminal is displayed, and a skeleton animation of an animation model is displayed on the real-world image; a currently displayed target real-world image is captured in a case that a photographing instruction is received, and the skeleton animation of the animation model is recorded, to obtain the recorded skeleton animation; image compositing is performed on the target real-world image and each frame of image of the recorded skeleton animation, to obtain a plurality of composited images; and the plurality of composited images are combined into a corresponding dynamic image. Based on the solutions, the real-world image and the skeleton animation of the animation model may be automatically composited into the corresponding dynamic image, and a user does not need to perform a large quantity of repetitive image addition and selection operations. Therefore, compositing efficiency of the dynamic image can be improved.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person skilled in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person skilled in the art based on the embodiments of this application without creative efforts shall fall within the protection scope of the embodiments of this application.

An embodiment of this application provides a dynamic image compositing system, the system includes a dynamic image compositing apparatus provided in any embodiment of this application, the dynamic image compositing apparatus may be integrated in a terminal, and the terminal may be a device such as a mobile phone or a tablet computer. Moreover, the system may further include other devices, such as, a server.

Figure 1A:
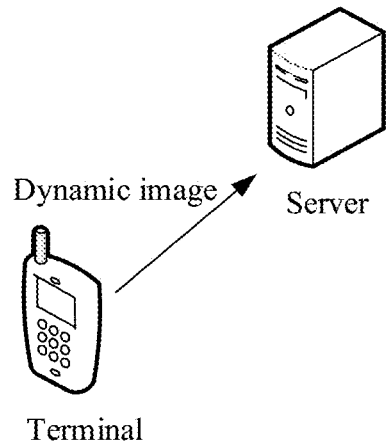
FIG. 1a is a schematic diagram of a scenario of a dynamic image compositing system according to an embodiment of this application.

Referring to FIG. 1a, an embodiment of this application provides a dynamic image compositing system, including: a terminal and a server, and the terminal is connected to the server through a network.

The terminal displays a real-world image captured by the terminal, and displays a skeleton animation of an animation model on the real-world image; seizes a currently displayed target real-world image in a case that a photographing instruction is received, and records the skeleton animation of the animation model, to obtain the recorded skeleton animation; performs image compositing on the target real-world image and each frame of image of the recorded skeleton animation, to obtain a plurality of composited images; and combines the plurality of composited images into a corresponding dynamic image. The terminal transmits the dynamic image to the server or stores the dynamic image locally.

This embodiment is described from the perspective of a dynamic image compositing apparatus, the dynamic image compositing apparatus is specifically located in a terminal, and the terminal may be a device such as a mobile phone, a tablet computer, or a notebook computer.

Figure 1B:
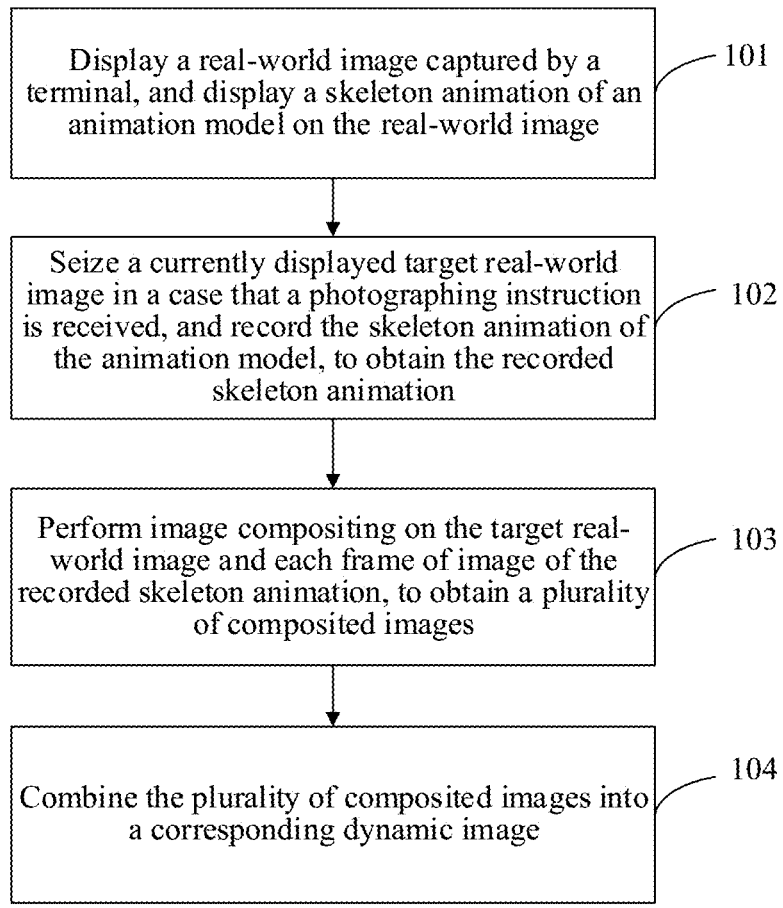
FIG. 1b is a schematic flowchart of a dynamic image compositing method according to an embodiment of this application.

As shown in FIG. 1b, a specific procedure of the dynamic image compositing method may be as follows:

101. Display a real-world image captured by a terminal, and display a skeleton animation of an animation model on the real-world image.

The real-world image may be an image captured by a camera of the terminal. In other words, in this embodiment, the real-world image may be captured through the camera on the terminal, and the captured real-world image may be displayed.

The animation model is a subject of an animation, and the subject may be set according to an actual requirement. For example, the subject may be a pet such as a cat or a dog, a person or the like.

The skeleton animation of the animation model may be an animation generated by controlling a location, a rotation direction and zoom-in/zoom-out of the skeleton of the animation model, for example, an animation generated by performing corresponding movement by controlling a head, a left hand, a right hand, a body, a left foot, a right foot or the like of the skeleton of the animation model.

In this embodiment, the skeleton animation may be a spine skeleton animation, or may be an animation in other frames or a skeleton animation in another runtime library.

During actual application, a user may select a required skeleton animation. For example, the terminal may display action icons of various skeleton actions of the animation model, each skeleton action corresponds to one skeleton animation, and the user may select a displayed skeleton animation through an action picture. In other words, the operation of "displaying a skeleton animation of an animation model on the real-world image" may include:

receiving an animation display instruction triggered by the user through a skeleton action icon, the animation display instruction instructing to display a skeleton animation corresponding to the skeleton action icon; and displaying the skeleton animation corresponding to the animation model on the real-world image according to the animation display instruction.

Figure 1C:
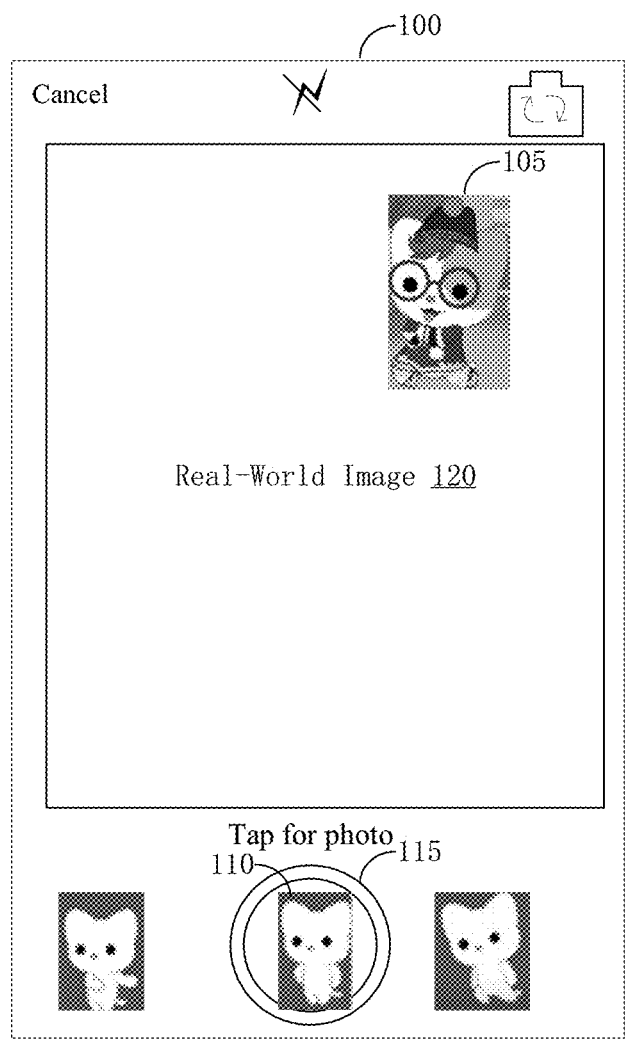
FIG. 1c is a schematic diagram of a skeleton of an animation model according to an embodiment of this application.

For example, referring to FIG. 1c, a plurality of skeleton action icons are displayed at the bottom of a camera interface 100, and the user may select a corresponding skeleton animation 105 by tapping a skeleton action icon 110, or moving a skeleton action icon into a selection box (a round photographing button 115 in the figure). In this case, the terminal triggers generation of an animation display instruction. In this way, the dynamic image compositing apparatus in this embodiment receives the instruction, and displays the skeleton animation 105 corresponding to the animation model on the real-world image 120 according to the instruction.

In some embodiments, to improve diversity of the composited dynamic image, in this embodiment, a display location of the animation model on the real-world image may be further set according to a user requirement. For example, the animation model may be moved to a designated location on the real-world image, and then the skeleton animation of the animation model is displayed on the designated location. For example, the method in this embodiment may further include: receiving a movement instruction of the animation model, the instruction indicating a target location on the real-world image to which the animation model needs to be moved, and moving the animation model to the target location on the real-world image according to the movement instruction. In this case, the skeleton animation of the animation model may be displayed on the target location on the real-world image.

Figure 1D:
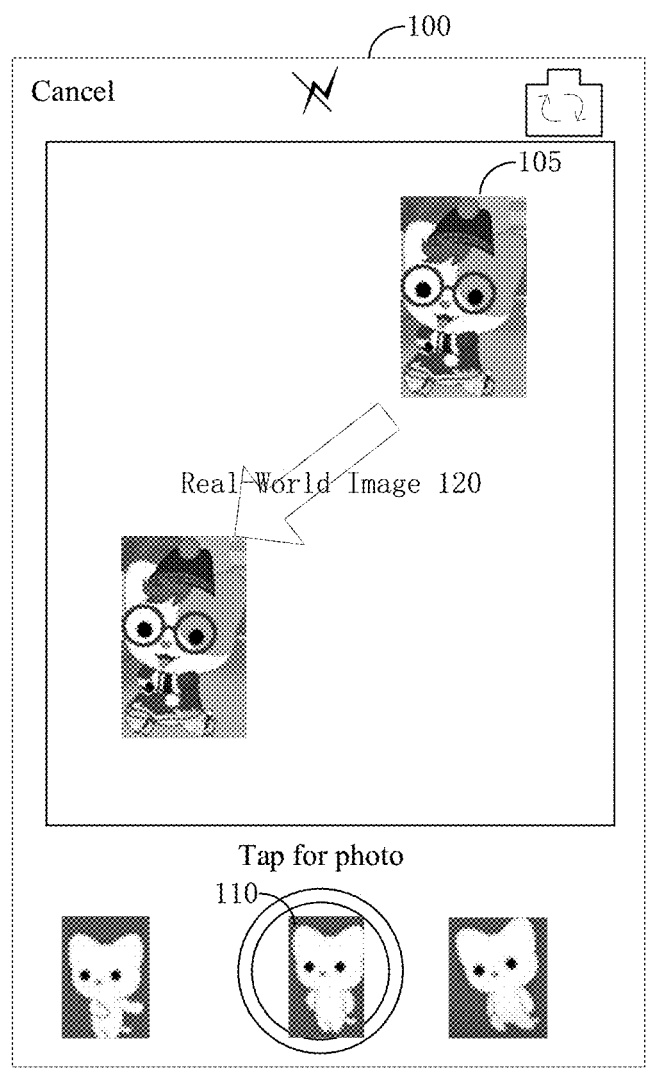
FIG. 1d is a schematic diagram of dragging an animation model on a camera interface according to an embodiment of this application.

For example, referring to FIG. 1d, after the real-world image 120 is displayed on the camera interface 100, the skeleton animation model 105 (that is, a pet) may be moved to a location designated by the user, and then the user may choose, by triggering a skeleton action icon 110, to play the corresponding skeleton animation 105 of the animation model on the location, referring to FIG. 1c.

To improve display effects of the real-world image and the skeleton animation, and prevent display of the real-world image and display of the skeleton animation from affecting each other, in this embodiment, the real-world image and the skeleton animation may be respectively displayed by using two image display components. In other words, the operation of "displaying a real-world image captured by the terminal, and displaying a skeleton animation of an animation model on the real-world image" may include:

displaying, through a first image display component of the terminal system, the real-world image captured by the terminal; and displaying the skeleton animation of the animation model through a second image display component of the terminal system, where the second image display component is superimposed on the first image display component.

The first image display component and the second image display component may have the same size, and may completely coincide. To better display the skeleton animation, the background of the second image display component may be set to be transparent. In this way, the skeleton animation may be better displayed on the real-world image.

For example, in a case that the terminal system is an Android system, the first image display component may be TextureView, and the second image display component may be GLSurfaceView. In this way, a full-screen TextureView configured to display a camera image, that is, the real-world image may be placed on an entire Activity, and moreover a GLSurfaceView of the same size is placed on the TextureView. The two completely coincide, and the GLSufaceView is configured to render an animation. A spine skeleton animation may be used as an animation herein, the skeleton animation is displayed on the GLSurfaceView, and the background is set to be transparent. In this way, the skeleton animation can be displayed on a real image.

102. Seize a currently displayed target real-world image in a case that a photographing instruction is received, and record the skeleton animation of the animation model, to obtain the recorded skeleton animation.

The photographing instruction is triggered in a plurality of manners, for example, triggered through a user operation or voice control. For example, referring to FIG. 1c, in a case that the user taps the photographing button on the camera interface, the photographing instruction is triggered. In this case, the dynamic image compositing apparatus in this embodiment receives the instruction.

In some embodiments, an image may be captured through a display component for displaying an image in this embodiment. For example, the operation of "seizing a currently displayed target real-world image, and recording the skeleton animation of the animation model" may include:

seizing the currently displayed target real-world image through the first image display component, and simultaneously recording the skeleton animation of the animation model through the second image display component.

For example, in a case that a photographing instruction is received, the TextureView seizes the currently displayed real-world image, and writes the real-world image to an internal memory, and moreover the GLSurfaceView records the currently displayed skeleton animation.

Specifically, the second image display component may seize the currently displayed skeleton animation at intervals of a particular time length, so as to record the animation. In other words, the operation of "recording the skeleton animation of the animation model through the second image display component" may include: seizing a currently displayed skeleton animation image of the animation model at intervals of a preset time length through the second image display component to serve as a frame of image of the recorded skeleton animation.

The preset time length may be set according to an actual requirement, and may be, for example, 1 ms, or 3 ms.

In some embodiments, to help the user composite a dynamic image, in this embodiment, the captured real-world image and the recorded animation may be displayed on a corresponding interface. To improve display effects and quality of the real-world image and the recorded animation on the interface, in this embodiment, the image may be displayed through parent and child display controls. In other words, after the skeleton animation is recorded, and before the image is composited, the compositing method in this embodiment may further include:

setting the target real-world image into a parent image display control, and setting a target frame of image of the recorded skeleton animation into a child image display control of the parent image display control; and displaying the target real-world image and the target frame of image on a corresponding interface through the parent image display control and the child image display control.

The interface may be set according to an actual requirement. For example, the real-world image and a frame of image of the animation may be displayed on an image compositing editing interface. Moreover, a target frame of image of the skeleton animation may be selected according to an actual requirement. For example, the first frame of image of the skeleton animation is selected as the target frame of image.

In this embodiment, the parent and child image display controls may be parent ImageView and child ImageView in the Android system.

In some embodiments, to restore a location relationship between the skeleton animation and the target real-world image during image display, and improve accuracy and quality of image compositing of the animation, in this embodiment, in a case that the photographing instruction is received (for example, the user presses a shutter button on the camera interface to trigger the photographing instruction), an animation offset location of the skeleton animation relative to the real-world image may be recorded. When the image is subsequently displayed on the interface, locations of the parent and child image display controls relative to each other may be adjusted or set based on the animation offset location. In other words, the method in this embodiment may further include: recording, in a case that the photographing instruction is received, an animation offset location of the current skeleton animation of the animation model relative to the real-world image.

In this case, the operation of "displaying the target real-world image and the target frame of image on a corresponding interface through the parent image display control and the child image display control" may include:

setting an offset location of the child image display control relative to the parent image display control according to the animation offset location; and displaying the target real-world image and the target frame of image on the corresponding interface according to the parent image display control and the child image display control after the setting.

The animation offset location may be an upper left or upper right offset location of the skeleton animation relative to the real-world image, and an offset reference of the skeleton animation on the real-world image may be set according to an actual requirement. For example, the center point, the top, the bottom or the like of the real-world image is used as a reference.

In some embodiments, to enable display of the real-world image and a frame of image to match the size of the screen of the terminal, in the method in this embodiment, after the offset location between the parent and child image display controls is set, the parent and child image display controls may be further scaled as a whole, so as to adapt to the size of the screen of the terminal. For example, the parent and child image display controls are scaled as a whole according to size parameters (the width, the height and the like) of the screen of the terminal.

103. Perform image compositing on the target real-world image and each frame of image of the recorded skeleton animation, to obtain a plurality of composited images.

For example, the target real-world image may be used as a background image, and then image compositing is performed on each frame of image of the recorded skeleton animation on the background image. For example, in a case that the recorded skeleton animation includes five frames, the five frames of images may be each composited on the target real-world image.

In some embodiments, to enable locations of the skeleton animation and the real-world image relative to each other in the composited dynamic image to be the same as those before compositing, and improve precision of compositing the dynamic image, in this embodiment, image compositing may be performed on each frame of image of the recorded skeleton animation and the background image according to a current offset location of the child image display control relative to the parent image display control (that is, an offset location of the target frame of image relative to the target real-world image), to obtain the composited image.

During an actual application, the current offset location between the parent and child image display controls may be the same as or different from an offset location that is set according to an animation offset. For example, the user may change the offset location by dragging the animation model on the interface. In this case, the offset location is different from an offset location between the parent and child image display controls that is set according to an animation offset.

Figure 1E:
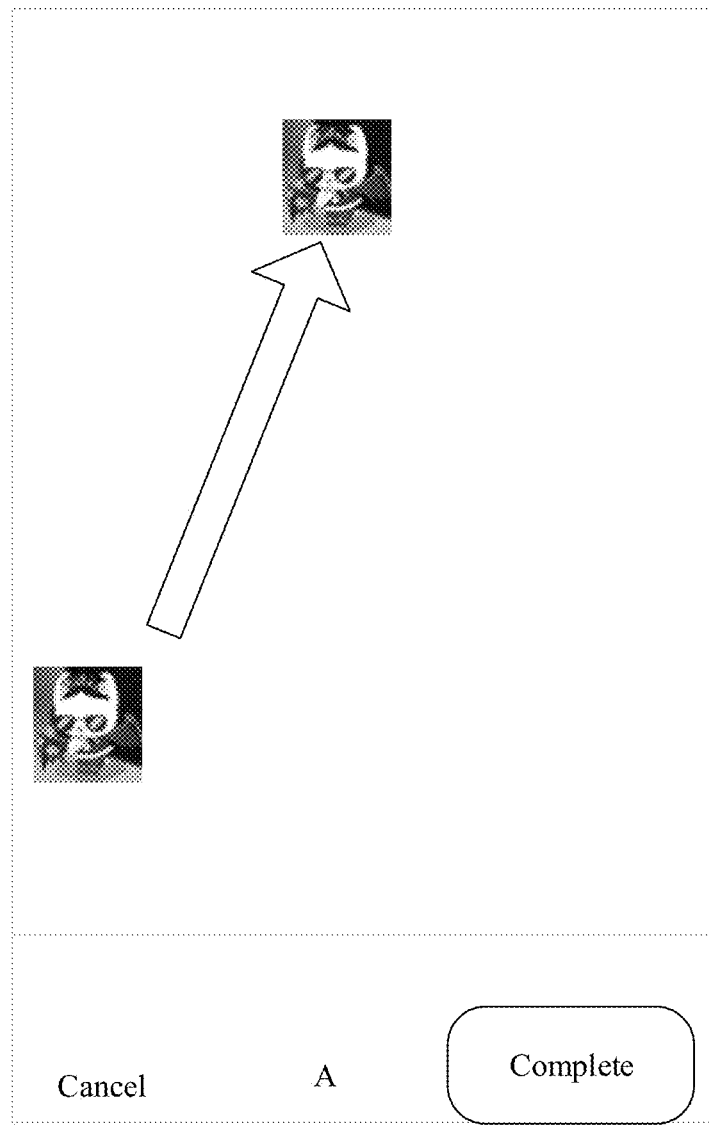
FIG. 1e is a schematic diagram of dragging an animation model on an editing interface according to an embodiment of this application.

For example, after the target real-world image and the target frame of image are displayed on the corresponding interface, a movement request inputted by the user is received, the movement request indicating a target location to which the child image display control needs to be moved, and the child image display control is moved to the target location according to the movement request. Referring to FIG. 1e, the user may drag the animation model to a designated location on the editing interface, and in response to the dragging of the user, the terminal moves the child image display control to the corresponding designated location.

In this case, the offset location between the parent and child image display controls is changed, and during subsequent compositing, image compositing may be performed based on the changed offset location.

In some embodiments, to increase diversity of the dynamic image, and improve user experience, an information display box may be further added to the interface in this embodiment. A location is determined in an interface according to a location of the animation model and a size of the skeleton animation, and an information display box is added to the location; information inputted by a user is displayed in the information display box; image capture is performed on the information display box, to obtain an information display box image; and the information display box image is added to the dynamic image. In a case that the information display box image is added to the dynamic image, image compositing is performed on the information display box image and each of the plurality of composited images, and obtained images are combined into the dynamic image.

For example, the information display box may be added to a corresponding location based on the animation offset location and the size of the skeleton animation. In other words, the operation of "performing image compositing on the target real-world image and each frame of image of the recorded skeleton animation" includes:

adding the information display box to a corresponding location on the interface according to the animation offset location and the size of the skeleton animation;

displaying a corresponding text in the information display box;

performing image capture on the information display box, to obtain an information display box image; and performing image compositing on the target real-world image, the information display box image, and each frame of image of the recorded skeleton animation.

The size of the skeleton animation includes size parameters of the skeleton animation such as the width and the height. For example, the information display box may be added to a corresponding location on the editing interface according to the animation offset location and the width and the height of the skeleton animation.

The information display box is in a plurality of forms, such as, bubble.

After the information display box is added, information inputted by the user may be obtained, and the information inputted by the user is displayed in the information display box. The information displayed in the information display box may include text information, picture information and the like.

After the information is displayed in the information display box, in the method in this embodiment, image capture may be individually performed on the information display box, to obtain a corresponding information display box image such as a bubble text image, and then image compositing is performed on the target real-world image, the information display box image, and each frame of image of the recorded skeleton animation.

A compositing order of the information display box image, the target real-world image, frames of images of the skeleton animation may be set according to an actual requirement. For example, to improve quality of compositing the dynamic image, an image compositing order in this embodiment may be the real-world image→the skeleton animation→the information display box image, such as, a real-world photograph→the skeleton animation→a bubble text picture. In other words, the real-world image and the frames of images of the skeleton animation are first composited, and then a composited image is composited with the information display box image. Specifically, the operation of "performing image compositing on the target real-world image, the information display box image, and each frame of image of the recorded skeleton animation" may include:

determining a current to-be-composited frame of image in the recorded skeleton animation;

taking the target real-world image as a background image;

performing image compositing on the background image and the current to-be-composited frame of image according to a current offset location of the child image display control relative to the parent image display control, to obtain a composited skeleton animation image;

performing image compositing on the information display box image and the composited skeleton animation image; and determining whether a to-be-composited frame of image exists in the recorded skeleton animation; and if yes, returning to perform the operation of determining a current to-be-composited frame of image in the recorded skeleton animation.

104. Combine the plurality of composited images into a corresponding dynamic image.

In this embodiment, after image compositing, a group of consecutive composited images may be obtained, and in this case, the group of consecutive composited images may be combined into a dynamic image.

There may be a plurality of combination manners. For example, the combination may be performed according to capture time points of skeleton animation frames corresponding to the composited images.

The target real-world image may be used as the background of the dynamic image in this embodiment, and frames of images of the skeleton animation are continuously displayed on the background.

In this embodiment, after the dynamic image is obtained, the dynamic image may be further locally stored or be transmitted to the server, and the server transmits the dynamic image to a terminal of another user.

It can be known from the above description that, in this embodiment of this application, a real-world image captured by a terminal is displayed, and a skeleton animation of an animation model is displayed on the real-world image; a currently displayed target real-world image is captured in a case that a photographing instruction is received, and the skeleton animation of the animation model is recorded, to obtain the recorded skeleton animation; image compositing is performed on the target real-world image and each frame of image of the recorded skeleton animation, to obtain a plurality of composited images; and the plurality of composited images are combined into a corresponding dynamic image. Based on the solution, the real-world image and the skeleton animation of the animation model may be automatically composited into the corresponding dynamic image, and a user does not need to perform a large quantity of repetitive image addition and selection operations. Therefore, compositing efficiency of the dynamic image can be improved.

Moreover, a solution of the embodiments of this application provides a dynamic image compositing technology combining an animation and photographing, which is also a new photographing manner, to provide a user with more vivid and richer photographing experience, attract the user to use a pet camera function in a product, heave activity and a photograph uploading quantity, and enable the user to achieve a distinctive dynamic image photographing effect during photographing.

An embodiment of this application provides a dynamic image compositing system, including a terminal and a server, and referring to FIG. 1a, the terminal is connected to the server through a network.

An animation implementation method in an embodiment of this application is further described below based on the foregoing dynamic image compositing system.

Figure 2A:
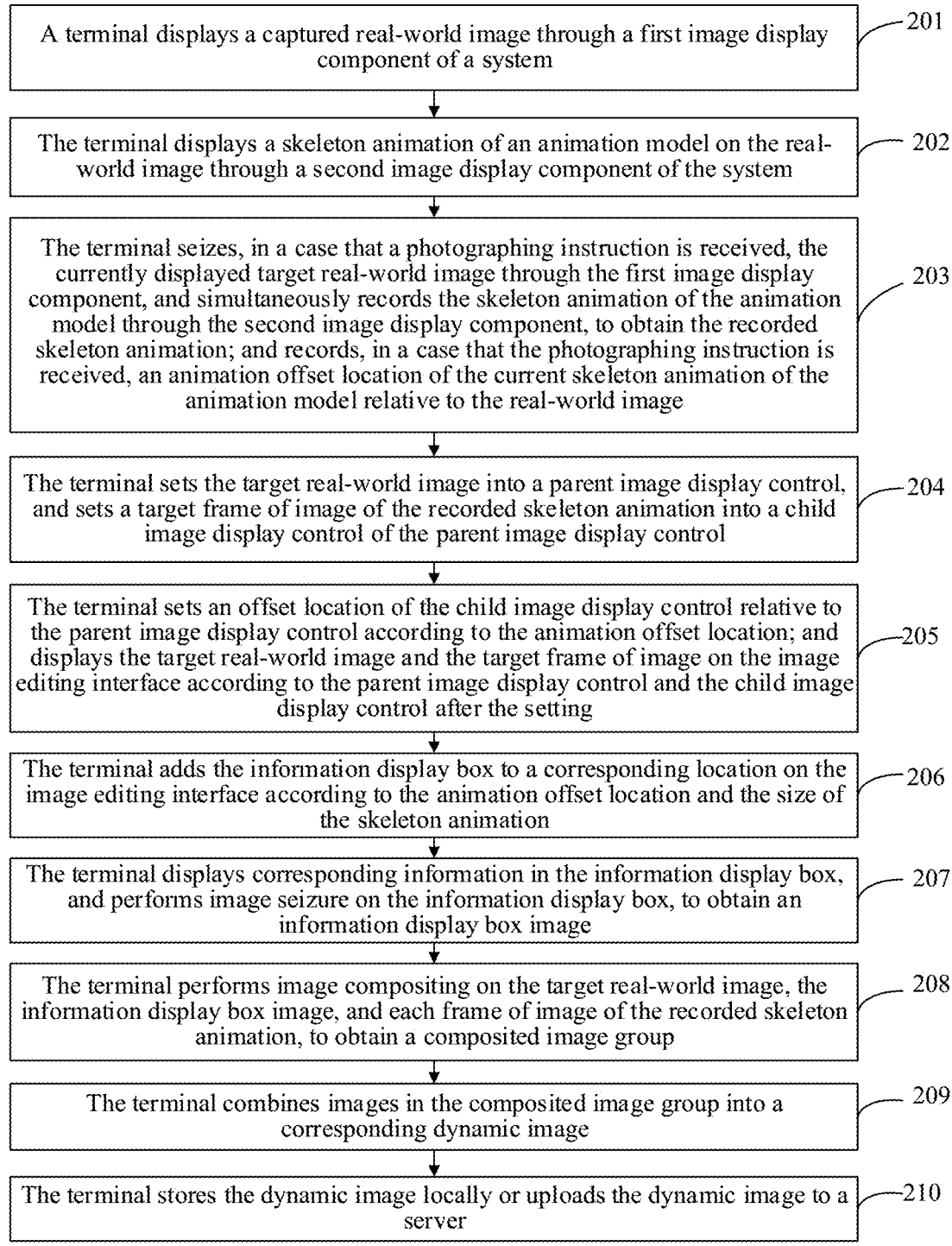
FIG. 2a is another schematic flowchart of a dynamic image compositing method according to an embodiment of this application.

As shown in FIG. 2a, a specific procedure of a dynamic image compositing method may be as follows:

201. A terminal displays a captured real-world image through a first image display component of a system.

The real-world image may be an image captured by a camera of the terminal. In other words, in this embodiment, the real-world image may be captured through the camera on the terminal, and the captured real-world image may be displayed through the first image display component.

The first image display component may be TextureView in an Android system.

Figure 2B:
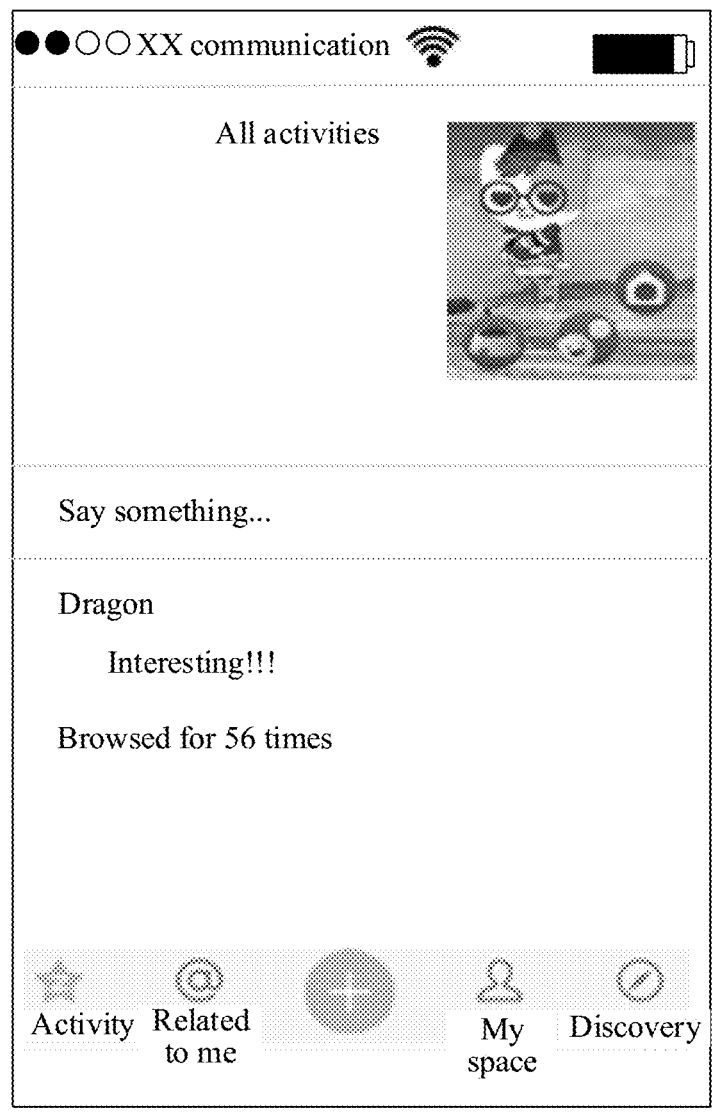
FIG. 2b is a schematic diagram of a message page of a social product according to an embodiment of this application.
Figure 2C:
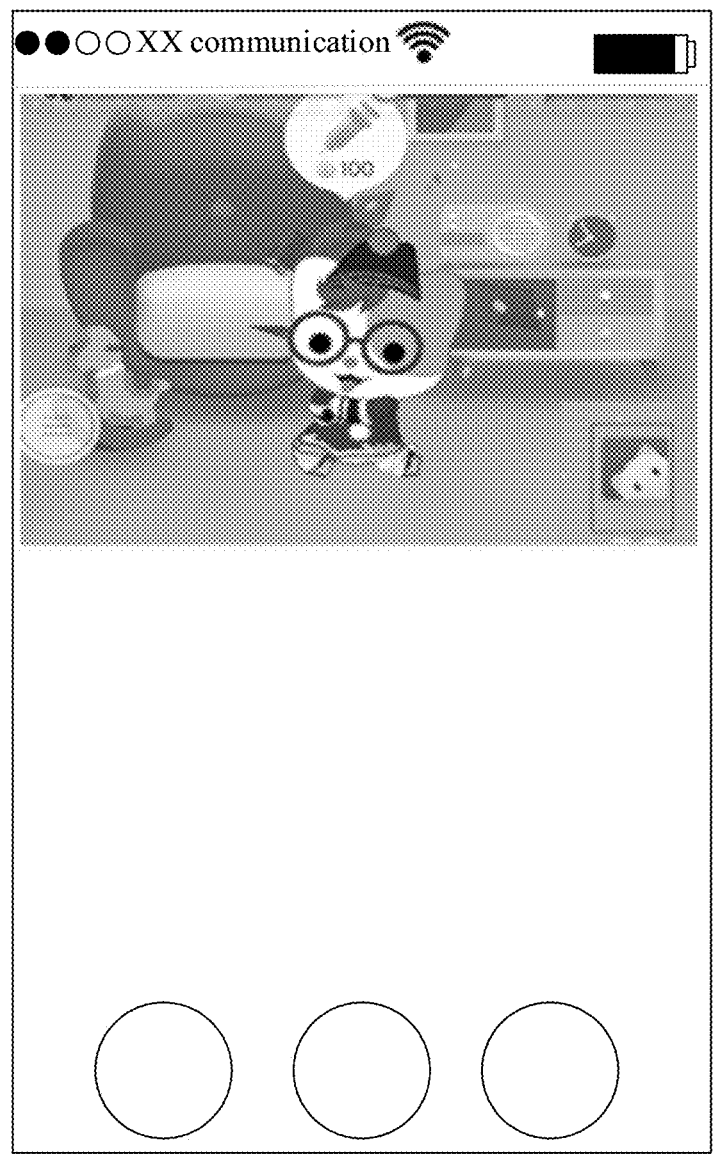
FIG. 2c is a schematic diagram of a pet homepage according to an embodiment of this application.
Figure 2D:
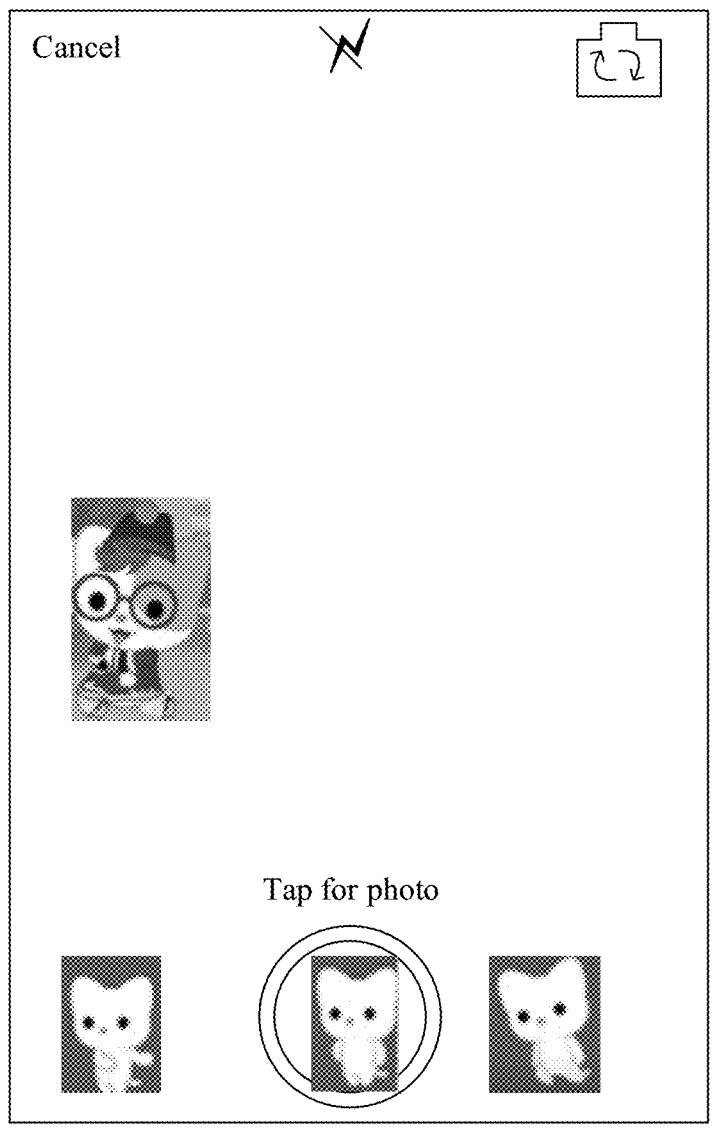
FIG. 2d is a schematic diagram of a camera interface according to an embodiment of this application.

Referring to FIG. 2b, in a case that a user taps a pet, a corresponding menu pops up; and in a case that the user taps a pet homepage icon, a pet homepage interface is displayed, referring to FIG. 2c. Later, in a case that the user taps a camera photographing icon in a pet homepage, the terminal enters a camera photographing interface, referring to FIG. 2d. The terminal displays, on the camera photographing interface through the first image display component, a real-world image captured by a camera, and displays an animation model on a camera interface through a second image display component.

202. The terminal displays a skeleton animation of an animation model on the real-world image through a second image display component of the system.

The animation model is a subject of an animation, and the subject may be set according to an actual requirement. For example, the subject may be a pet such as a cat or a dog, a person or the like.

The skeleton animation of the animation model may be an animation generated by controlling a location, a rotation direction and zoom-in/zoom-out of the skeleton of the animation model, for example, an animation generated by performing corresponding movement by controlling a head, a left hand, a right hand, a body, a left foot, a right foot or the like of the skeleton of the animation model.

In this embodiment, the skeleton animation may be a spine skeleton animation, or may be an animation in other frames or a skeleton animation in another runtime library.

The second image display component may be GLSurfaceView in the Android system. In this embodiment, a full-screen TextureView configured to display a camera image, that is, the real-world image may be placed on an entire Activity, and moreover a GLSurfaceView of the same size is placed on the TextureView. The two completely coincide, and the GLSufaceView is configured to render an animation. A spine skeleton animation may be used as an animation herein, the skeleton animation is displayed on the GLSurfaceView, and the background is set to be transparent. In this way, the skeleton animation can be displayed on a real image.

During an actual application, the terminal may receive an animation display instruction triggered by the user through a skeleton action icon, the animation display instruction instructing to display a skeleton animation corresponding to the skeleton action icon; and display the skeleton animation corresponding to the animation model on the real-world image according to the animation display instruction. Referring to FIG. 1c, the user may drag the animation model to a designated location on the camera interface, and select a corresponding skeleton animation by tapping a skeleton action picture.

203. In a case that a photographing instruction is received, the terminal seizes the currently displayed target real-world image through the first image display component, and simultaneously records the skeleton animation of the animation model through the second image display component, to obtain the recorded skeleton animation; and records, in a case that the photographing instruction is received, an animation offset location of the current skeleton animation of the animation model relative to the real-world image.

The photographing instruction is triggered in a plurality of manners, for example, triggered through a user operation or voice control. For example, referring to FIG. 1c, in a case that the user taps the photographing button on the camera interface, the photographing instruction is triggered. In this case, the dynamic image compositing apparatus in this embodiment receives the instruction.

For example, in a case that a photographing instruction is received, the TextureView seizes the currently displayed real-world image, and writes the real-world image to an internal memory, and moreover the GLSurfaceView seizes a currently displayed skeleton animation image of the animation model at intervals of a preset time length, so as to record a skeleton animation.

The preset time length may be set according to an actual requirement, and may be, for example, 0.11 ms, or 2 ms.

204. The terminal sets the target real-world image into a parent image display control, and sets a target frame of image of the recorded skeleton animation into a child image display control of the parent image display control.

In this embodiment, the parent and child image display controls may be parent ImageView and child ImageView in the Android system.

205. The terminal sets an offset location of the child image display control relative to the parent image display control according to the animation offset location; and displays the target real-world image and the target frame of image on the image editing interface according to the parent image display control and the child image display control after the setting.

In this embodiment, frames of pictures of the animation may be set onto the child ImageView according to the previously recorded animation offset value and restored to the offset location relative to the parent ImageView.

206. The terminal adds the information display box to a corresponding location on the image editing interface according to the animation offset location and the size of the skeleton animation.

The size of the skeleton animation includes size parameters of the skeleton animation such as the width and the height. For example, the information display box may be added to a corresponding location on the editing interface according to the animation offset location and the width and the height of the skeleton animation. The information display box is in a plurality of forms, such as, bubble and balloon.

207. The terminal displays corresponding information in the information display box, and performs image capture on the information display box, to obtain an information display box image.

The information displayed in the information display box may include text information, picture information and the like.

Figure 2E:
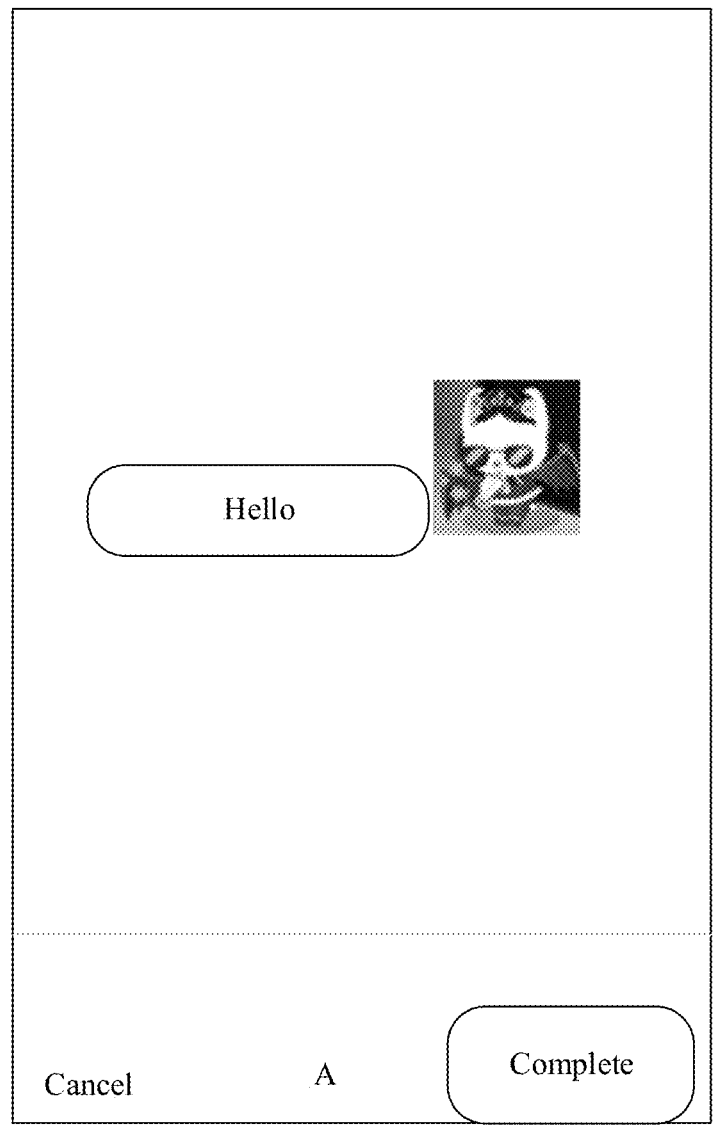
FIG. 2e is a schematic diagram of an image editing interface according to an embodiment of this application.

Referring to FIG. 2e, a text bubble is added to a corresponding location on the image editing interface, and text information or the like inputted by the user may be displayed in the text bubble.

208. The terminal performs image compositing on the target real-world image, the information display box image, and each frame of image of the recorded skeleton animation, to obtain a composited image group.

The composited image group includes a plurality of composited images, for example, a group of consecutive composited images.

A compositing order of the information display box image, the target real-world image, frames of images of the skeleton animation may be set according to an actual requirement. For example, to improve quality of compositing the dynamic image, an image compositing order in this embodiment may be the real-world image→the skeleton animation→the information display box image, such as, a real-world photograph→the skeleton animation→a bubble text picture.

For example, an image compositing process of the terminal may include:

determining a current to-be-composited frame of image in the recorded skeleton animation;

taking the target real-world image as a background image;

performing image compositing on the background image and the current to-be-composited frame of image according to a current offset location of the child image display control relative to the parent image display control, to obtain a composited skeleton animation image;

performing image compositing on the information display box image and the composited skeleton animation image; and determining whether a to-be-composited frame of image exists in the recorded skeleton animation; and if yes, returning to perform the operation of determining a current to-be-composited frame of image in the recorded skeleton animation; or if not, performing step 209.

For example, in a case that the user taps a "complete" button in FIG. 2e, the terminal performs image compositing on the target real-world image, the information display box image, and each frame of image of the recorded skeleton animation, to obtain a composited image group.

209. The terminal combines images in the composited image group into a corresponding dynamic image.

There may be a plurality of combination manners. For example, the combination may be performed according to capture time points of skeleton animation frames corresponding to the composited images.

The target real-world image may be used as the background of the dynamic image in this embodiment, and frames of images of the skeleton animation are continuously displayed on the background.

210. The terminal stores the dynamic image locally or uploads the dynamic image to a server.

For example, the terminal transmits the dynamic image to the server, and the server forwards the dynamic image to another terminal.

It can be known from the above description that, in this embodiment of this application, a real-world image captured by a terminal is displayed, and a skeleton animation of an animation model is displayed on the real-world image; a currently displayed target real-world image is captured in a case that a photographing instruction is received, and the skeleton animation of the animation model is recorded, to obtain the recorded skeleton animation; image compositing is performed on the target real-world image and each frame of image of the recorded skeleton animation, to obtain a plurality of composited images; and the plurality of composited images are combined into a corresponding dynamic image. Based on the solution, the real-world image and the skeleton animation of the animation model may be automatically composited into the corresponding dynamic image, and a user does not need to perform a large quantity of repetitive image addition and selection operations. Therefore, compositing efficiency of the dynamic image can be improved.

Moreover, a solution of the embodiments of this application provides a dynamic image compositing technology combining an animation and photographing, which is also a new photographing manner, to provide a user with more vivid and richer photographing experience, attract the user to use a pet camera function in a product, heave activity and a photograph uploading quantity, and enable the user to achieve a distinctive dynamic image photographing effect during photographing.

Figure 3A:
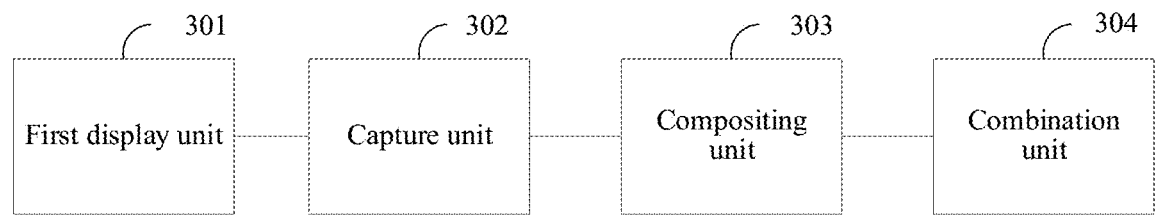
FIG. 3a is a first schematic structural diagram of a dynamic image compositing apparatus according to an embodiment of this application.

To better implement the foregoing method, an embodiment of this application further provides a dynamic image compositing apparatus. As shown in FIG. 3a, the dynamic image compositing apparatus may include: a first display unit 301, a capture unit 302, a compositing unit 303 and a combination unit 304, which are as follows:

(1) First Display Unit 301

The first display unit 301 is configured to display a real-world image captured by a terminal, and display a skeleton animation of an animation model on the real-world image.

The real-world image may be an image captured by a camera of the terminal. In other words, in this embodiment, the real-world image may be captured through the camera on the terminal, and the captured real-world image may be displayed.

The animation model is a subject of an animation, and the subject may be set according to an actual requirement. For example, the subject may be a pet such as a cat or a dog, a person or the like.

In this embodiment, the skeleton animation may be a spine skeleton animation, or may be an animation in other frames or a skeleton animation in another runtime library.

The first display unit 301 may be configured to: display, through a first image display component of the terminal system, the real-world image captured by the terminal; and display the skeleton animation of the animation model through a second image display component of the terminal system, where the second image display component is superimposed on the first image display component.

For example, in a case that the terminal system is an Android system, the first image display component may be TextureView, and the second image display component may be GLSurfaceView. In this way, a full-screen TextureView configured to display a camera image, that is, the real-world image may be placed on an entire Activity, and moreover a GLSurfaceView of the same size is placed on the TextureView. The two completely coincide, and the GLSufaceView is configured to render an animation. A spine skeleton animation may be used as an animation herein, the skeleton animation is displayed on the GLSurfaceView, and the background is set to be transparent. In this way, the skeleton animation can be displayed on a real image.

(2) Seizure Unit 302

The capture unit 302 is configured to seize a currently displayed target real-world image in a case that a photographing instruction is received, and record the skeleton animation of the animation model, to obtain the recorded skeleton animation.

For example, the capture unit 302 may be configured to seize the currently displayed target real-world image through the first image display component, and simultaneously record the skeleton animation of the animation model through the second image display component.

The capture unit 302 may be configured to seize a currently displayed skeleton animation image of the animation model at intervals of a preset time length through the second image display component.

For example, in a case that a photographing instruction is received, the TextureView seizes the currently displayed real-world image, and writes the real-world image to an internal memory, and moreover the GLSurfaceView records the currently displayed skeleton animation.

The preset time length may be set according to an actual requirement, and may be, for example, 1 ms, or 3 ms.

(3) Compositing Unit 303

The compositing unit 303 is configured to perform image compositing on the target real-world image and each frame of image of the recorded skeleton animation, to obtain a plurality of composited images.

For example, the compositing unit 303 may be configured to take the target real-world image as a background image; and perform image compositing on each frame of image of the recorded skeleton animation and the background image according to a current offset location of the child image display control relative to the parent image display control.

For another example, the compositing unit 303 may be specifically configured to:

add the information display box to a corresponding location on the interface according to the animation offset location and the size of the skeleton animation;

display corresponding information in the information display box;

perform image capture on the information display box, to obtain an information display box image; and perform image compositing on the target real-world image, the information display box image, and each frame of image of the recorded skeleton animation.

The compositing unit 303 may be specifically configured to:

determine a current to-be-composited frame of image in the recorded skeleton animation;

take the target real-world image as a background image;

perform image compositing on the background image and the current to-be-composited frame of image according to a current offset location of the child image display control relative to the parent image display control, to obtain a composited skeleton animation image;

perform image compositing on the information display box image and the composited skeleton animation image; and determine whether a to-be-composited frame of image exists in the recorded skeleton animation; and if yes, return to perform the operation of determining a current to-be-composited frame of image in the recorded skeleton animation.

(4) Combination Unit 304

The combination unit 304 is configured to combine the plurality of composited images into a corresponding dynamic image.

There may be a plurality of combination manners. For example, the combination unit 304 may perform the combination according to capture time points of skeleton animation frames corresponding to the composited images.

Figure 3B:
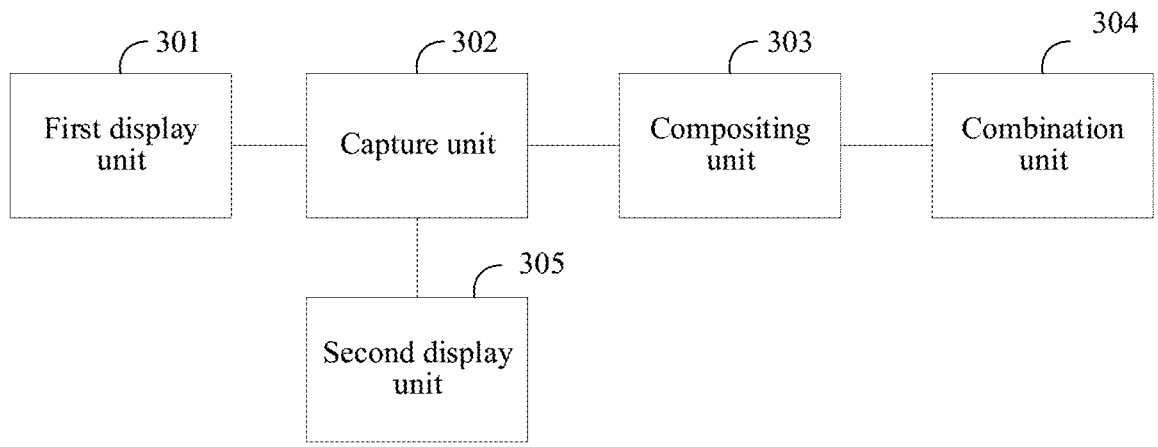
FIG. 3b is a second schematic structural diagram of a dynamic image compositing apparatus according to an embodiment of this application.

In some embodiments, to help the user composite a dynamic image, in this embodiment, the captured real-world image and the recorded animation may be displayed on a corresponding interface. To improve display effects and quality of the real-world image and the recorded animation on the interface, in this embodiment, the image may be displayed through parent and child display controls. Referring to FIG. 3b, the dynamic image compositing apparatus in this embodiment may further include a second display unit 305.

The second display unit 305 is configured to: after the capture unit 302 records the animation and before the compositing unit 303 composites the images, set the target real-world image into a parent image display control, and set a target frame of image of the recorded skeleton animation into a child image display control of the parent image display control; and display the target real-world image and the target frame of image on a corresponding interface through the parent image display control and the child image display control.

Figure 3C:
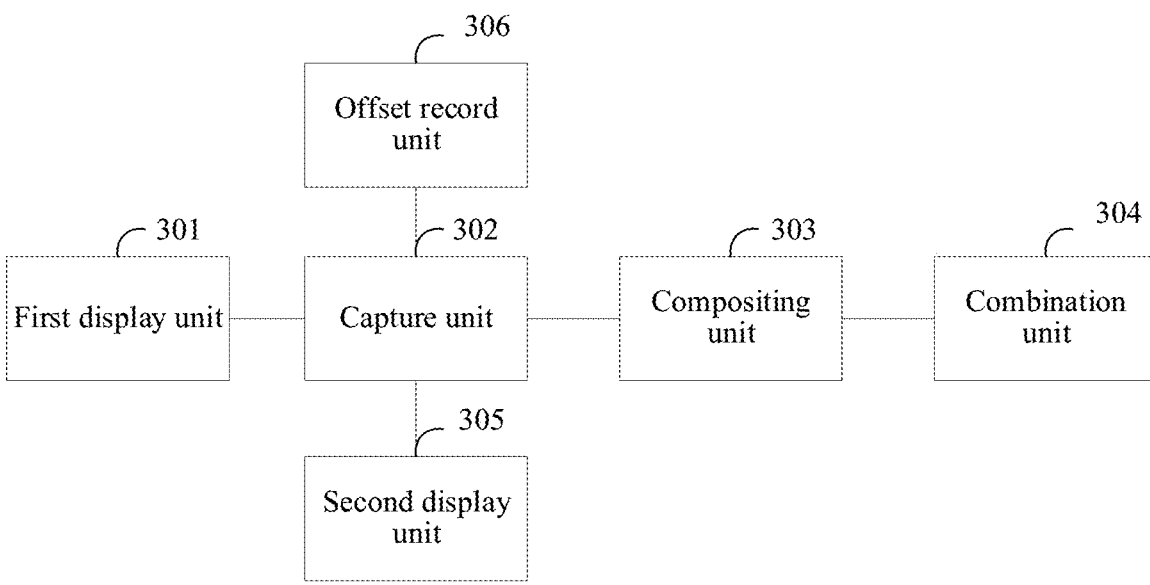
FIG. 3c is a third schematic structural diagram of a dynamic image compositing apparatus according to an embodiment of this application.

In some embodiments, to restore a location relationship between the skeleton animation and the target real-world image during image display, and improve accuracy and quality of image compositing of the animation, in this embodiment, in a case that the photographing instruction is received (for example, the user presses a shutter button on the camera interface to trigger the photographing instruction), an animation offset location of the skeleton animation relative to the real-world image may be recorded. When the image is subsequently displayed on the interface, locations of the parent and child image display controls relative to each other may be adjusted or set based on the animation offset location. Referring to FIG. 3c, the dynamic image compositing apparatus in this embodiment may further include an offset record unit 306.

The offset record unit 306 is configured to record, in a case that the photographing instruction is received, an animation offset location of the current skeleton animation of the animation model relative to the real-world image.

In this case, the second display unit 305 may be configured to:

set an offset location of the child image display control relative to the parent image display control according to the animation offset location; and display the target real-world image and the target frame of image on the corresponding interface according to the parent image display control and the child image display control after the setting.

The animation offset location may be an upper left or upper right offset location of the skeleton animation relative to the real-world image, and an offset reference of the skeleton animation on the real-world image may be set according to an actual requirement. For example, the center point, the top, the bottom or the like of the real-world image is used as a reference.

In a specific implementation, the foregoing units may be implemented as independent entities, or may be combined arbitrarily, or may be implemented as the same entity or several entities. For specific implementations of the foregoing units, refer to the foregoing method embodiments. Details are not described herein again.

The dynamic image compositing apparatus may be specifically integrated in a terminal, for example, integrated in a terminal in a client form, and the terminal may be a device such as a mobile phone or a tablet computer.

It can be known from the above description that, in this embodiment of this application, the first display unit 301 displays a real-world image captured by a terminal, and displays a skeleton animation of an animation model on the real-world image; the capture unit 302 seizes a currently displayed target real-world image in a case that a photographing instruction is received, and records the skeleton animation of the animation model, to obtain the recorded skeleton animation; the compositing unit 303 performs image compositing on the target real-world image and each frame of image of the recorded skeleton animation, to obtain a plurality of composited images; and the combination unit 304 combines the plurality of composited images into a corresponding dynamic image. Based on the solution, the real-world image and the skeleton animation of the animation model may be automatically composited into the corresponding dynamic image, and a user does not need to perform a large quantity of repetitive image addition and selection operations. Therefore, compositing efficiency of the dynamic image can be improved.

Moreover, a solution of the embodiments of this application provides a dynamic image compositing technology combining an animation and photographing, which is also a new photographing manner, to provide a user with more vivid and richer photographing experience, attract the user to use a pet camera function in a product, heave activity and a photograph uploading quantity, and enable the user to achieve a distinctive dynamic image photographing effect during photographing.

To better implement the foregoing method, an embodiment of this application further provides a terminal, and the terminal may be a device such as a mobile phone or a tablet computer.

Figure 4:
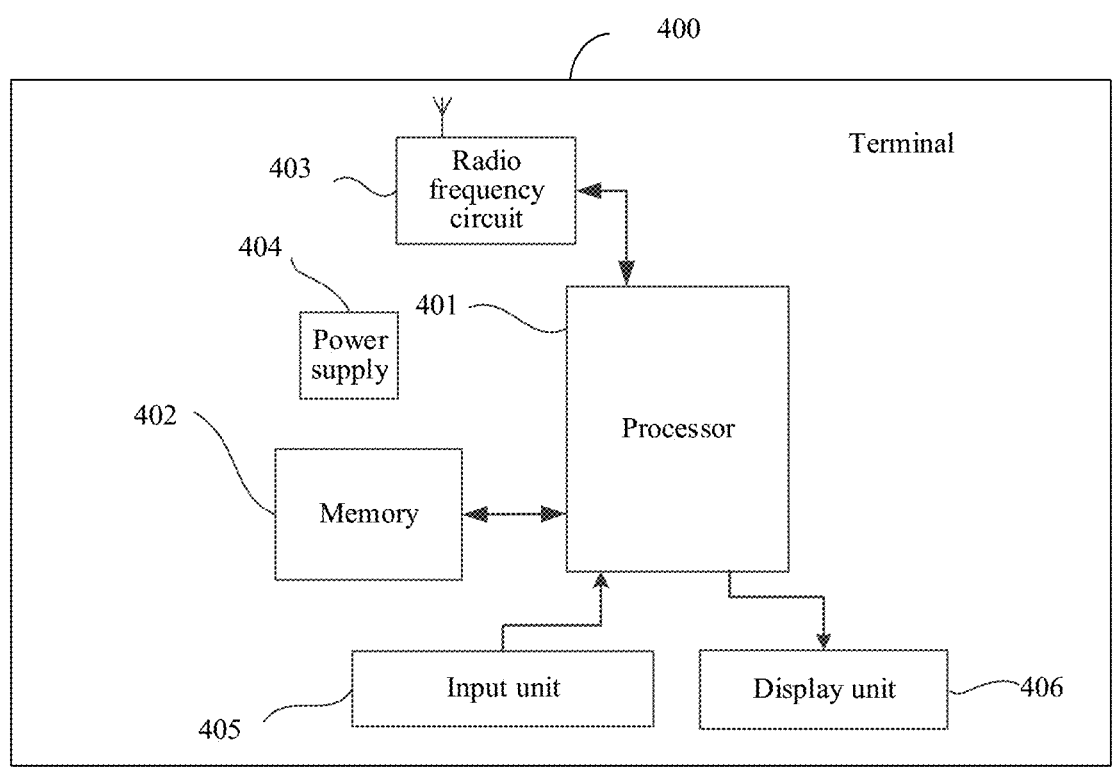
FIG. 4 is a schematic structural diagram of a terminal according to an embodiment of this application.

Referring to FIG. 4, an embodiment of this application provides a terminal 400 that may include components such as a processor 401 including one or more processing cores, a memory 402 including one or more computer-readable storage media, a radio frequency (RF) circuit 403, a power supply 404, an input unit 405, and a display unit 406. A person skilled in the art may understand that the structure of the terminal shown in FIG. 4 does not constitute a limitation to the terminal, and the terminal may include more or fewer components than those shown in the figure, or some components may be combined, or a different component deployment may be used.

The processor 401 is the control center of the terminal, and is connected to various parts of the terminal by using various interfaces and lines. By running or executing the software program and/or module stored in the memory 402, and invoking data stored in the memory 402, the processor 401 performs various functions and data processing of the terminal, thereby performing overall monitoring on the terminal. Optionally, the processor 401 may include one or more processing cores. Preferably, the processor 401 may integrate an application processor and a modem processor. The application processor mainly processes an operating system, a user interface, an application program, and the like. The modem processor mainly processes wireless communication. It may be understood that the foregoing modem processor may not be integrated into the processor 401.

The memory 402 may be configured to store a software program and module. The processor 401 runs the software program and module stored in the memory 402, to implement various functional applications and data processing.

The RF circuit 403 may be configured to receive and transmit a signal during information receiving and transmitting. Particularly, the RF circuit 403 transmits, after receiving downlink information from a base station, the information to the one or more processors 401 for processing. In addition, the RF circuit 403 transmits uplink data to the base station.

The terminal further includes the power supply 404 (for example, a battery) that supplies power to various components. Preferably, the power supply may be logically connected to the processor 401 by using a power management system, to implement functions such as charging, discharging, and power consumption management by using the power management system. The power supply 404 may further include one or more of a direct current or alternating current power supply, a re-charging system, a power failure detection circuit, a power supply converter or inverter, a power supply state indicator, and any other component.

The terminal may further include the input unit 405. The input unit 405 may be configured to receive entered numeric or character information and generate keyboard, mouse, joystick, optical, or trackball signal input related to user settings and function control.

The terminal may further include the display unit 406. The display unit 406 may be configured to display information entered by the user or information provided to the user, and graphical user interfaces of the terminal. The graphical user interfaces each may include an image, text, an icon, a video, or any combination thereof. The display unit 408 may include a display panel. Optionally, the display panel may be configured by using a liquid crystal display (LCD), an organic light-emitting diode (OLED), or the like.

Specifically, in this embodiment, the processor 401 in the terminal may load, according to the following instructions, executable files corresponding to processes of one or more application programs into the memory 402. The processor 401 runs the application programs stored in the memory 402, to implement various functions, which are as follows:

displaying a real-world image captured by a terminal, and displaying a skeleton animation of an animation model on the real-world image;

seizing a currently displayed target real-world image in a case that a photographing instruction is received, and recording the skeleton animation of the animation model, to obtain the recorded skeleton animation;

performing image compositing on the target real-world image and each frame of image of the recorded skeleton animation, to obtain a plurality of composited images; and combining the plurality of composited images into a corresponding dynamic image.

In some embodiments, the displaying a real-world image captured by the terminal, and displaying a skeleton animation of an animation model on the real-world image includes:

displaying, through a first image display component of the terminal system, the real-world image captured by the terminal; and displaying the skeleton animation of the animation model through a second image display component of the terminal system, where the second image display component is superimposed on the first image display component; and the seizing a currently displayed target real-world image, and recording the skeleton animation of the animation model includes:

seizing the currently displayed target real-world image through the first image display component, and simultaneously recording the skeleton animation of the animation model through the second image display component.

In some embodiments, the recording the skeleton animation of the animation model through the second image display component includes:

seizing a currently displayed skeleton animation image of the animation model at intervals of a preset time length through the second image display component.

In some embodiments, after the skeleton animation is recorded, and before the image is composited, the processor is further configured to perform the following steps:

setting the target real-world image into a parent image display control, and setting a target frame of image of the recorded skeleton animation into a child image display control of the parent image display control; and displaying the target real-world image and the target frame of image on a corresponding interface through the parent image display control and the child image display control.

In some embodiments, the processor is further configured to perform: recording, in a case that the photographing instruction is received, an animation offset location of the current skeleton animation of the animation model relative to the real-world image; and in this case, the displaying the target real-world image and the target frame of image on a corresponding interface through the parent image display control and the child image display control includes:

setting an offset location of the child image display control relative to the parent image display control according to the animation offset location; and displaying the target real-world image and the target frame of image on the corresponding interface according to the parent image display control and the child image display control after the setting.

In some embodiments, the performing image compositing on the target real-world image and each frame of image of the recorded skeleton animation includes:

taking the target real-world image as a background image; and performing image compositing on each frame of image of the recorded skeleton animation and the background image according to a current offset location of the child image display control relative to the parent image display control.

In some embodiments, the performing image compositing on the target real-world image and each frame of image of the recorded skeleton animation includes:

adding the information display box to a corresponding location on the interface according to the animation offset location and the size of the skeleton animation;

displaying corresponding information in the information display box;

performing image capture on the information display box, to obtain an information display box image; and performing image compositing on the target real-world image, the information display box image, and each frame of image of the recorded skeleton animation.

In some embodiments, the performing image compositing on the target real-world image, the information display box image, and each frame of image of the recorded skeleton animation includes:

determining a current to-be-composited frame of image in the recorded skeleton animation;

taking the target real-world image as a background image;

performing image compositing on the background image and the current to-be-composited frame of image according to a current offset location of the child image display control relative to the parent image display control, to obtain a composited skeleton animation image;

performing image compositing on the information display box image and the composited skeleton animation image; and determining whether a to-be-composited frame of image exists in the recorded skeleton animation; and if yes, returning to perform the operation of determining a current to-be-composited frame of image in the recorded skeleton animation.

It can be known from the above description that, in this embodiment of this application, the terminal displays a real-world image captured by the terminal, and displays a skeleton animation of an animation model on the real-world image; seizes a currently displayed target real-world image in a case that a photographing instruction is received, and records the skeleton animation of the animation model, to obtain the recorded skeleton animation; performs image compositing on the target real-world image and each frame of image of the recorded skeleton animation, to obtain a plurality of composited images; and combines the plurality of composited images into a corresponding dynamic image. Based on the solution, the real-world image and the skeleton animation of the animation model may be automatically composited into the corresponding dynamic image, and a user does not need to perform a large quantity of repetitive image addition and selection operations. Therefore, compositing efficiency of the dynamic image can be improved.

Moreover, a solution of the embodiments of this application provides a dynamic image compositing technology combining an animation and photographing, which is also a new photographing manner, to provide a user with more vivid and richer photographing experience, attract the user to use a pet camera function in a product, heave activity and a photograph uploading quantity, and enable the user to achieve a distinctive dynamic image photographing effect during photographing. A person of ordinary skill in the art may understand that all or a part of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, or an optical disc.

The dynamic image compositing method and apparatus, the terminal and the storage medium provided in the embodiments of this application are described above in detail. Although the principles and implementations of the embodiments of this application are described by using specific examples in the specification, the foregoing descriptions of the embodiments are only intended to help understand the method and core idea of the embodiments of this application. Moreover, a person skilled in the art may make modifications to the specific implementations and application range according to the idea of the embodiments of this application. In conclusion, the content of the specification is not to be construed as a limitation to this application.

What is claimed is:

1. A dynamic image compositing method performed at a terminal having one or more processors and memory storing a plurality of programs to be executed by the one or more processors, the method comprising:
    displaying a skeleton animation of an animation model on a real-world image captured by the terminal;
    receiving a photographing instruction;
    in response to the photographing instruction:
        capturing a currently displayed target real-world image and recording the skeleton animation of the animation model, the recorded skeleton animation including a plurality of image frames;
    associating the target real-world image with a parent image display control and each of the plurality of image frames of the animation model with a child image display control, respectively;
    performing image composition on the target real-world image and each of the plurality of image frames of the animation model according to a current offset location of the child image display control relative to the parent image display control, to obtain a plurality of composited images, each composited image having the target real-world image as its background and a corresponding image frame of the animation model; and
    combining the plurality of composited images into a dynamic image animation.

2. The dynamic image compositing method according to claim 1, wherein the displaying a skeleton animation of an animation model on a real-world image captured by the terminal comprises:
    displaying the captured real-world image through a first image display component of the terminal; and
    displaying the skeleton animation of the animation model through a second image display component of the terminal, wherein the second image display component is superimposed on the first image display component; and
    the capturing a currently displayed target real-world image and recording the skeleton animation of the animation model comprises:
    capturing the currently displayed target real-world image through the first image display component, and simultaneously recording the skeleton animation of the animation model through the second image display component.

3. The dynamic image compositing method according to claim 2, wherein the recording the skeleton animation of the animation model through the second image display component comprises:
    capturing a currently displayed skeleton animation image of the animation model at intervals of a preset time length through the second image display component to serve as a frame of image of the recorded skeleton animation.

4. The dynamic image compositing method according to claim 1, further comprising:
    displaying the target real-world image and each of the plurality of image frames of the animation model on an interface through the parent image display control and the child image display control.

5. The dynamic image compositing method according to claim 4, further comprising:
    in response to the photographing instruction, recording an animation offset location of the current skeleton animation of the animation model relative to the real-world image; and
    the displaying the target real-world image and each of the plurality of image frames of the animation model on a corresponding interface through the parent image display control and the child image display control comprises:
        setting the current offset location of the child image display control relative to the parent image display control according to the animation offset location; and
        displaying the target real-world image and each of the plurality of image frames of the animation model on the corresponding interface according to the parent image display control and the child image display control after the setting.

6. The dynamic image compositing method according to claim 1, further comprising:
    determining a location in an interface according to a location of the animation model and a size of the skeleton animation, and adding an information display box to the location;
    displaying, in the information display box, information inputted by a user;
    performing image capture on the information display box, to obtain an information display box image; and
    adding the information display box image to the dynamic image.

7. The dynamic image compositing method according to claim 6, wherein the adding the information display box image to the dynamic image comprises:
performing image composition on the information display box image and each of the plurality of composited images, and combining obtained images into the dynamic image.

8. A terminal comprising one or more processors, memory coupled to the one or more processors and a plurality of programs stored in the memory that, when executed by the one or more processors, cause the terminal to perform a plurality of operations comprising:
displaying a skeleton animation of an animation model on a real-world image captured by the terminal;
receiving a photographing instruction;
in response to the photographing instruction:
capturing a currently displayed target real-world image and recording the skeleton animation of the animation model, the recorded skeleton animation including a plurality of image frames;
associating the target real-world image with a parent image display control and each of the plurality of image frames of the animation model with a child image display control, respectively;
performing image composition on the target real-world image and each of the plurality of image frames of the animation model according to a current offset location of the child image display control relative to the parent image display control, to obtain a plurality of composited images, each composited image having the target real-world image as its background and a corresponding image frame of the animation model; and
combining the plurality of composited images into a dynamic image animation.

9. The terminal according to claim 8, wherein the displaying a skeleton animation of an animation model on a real-world image captured by the terminal comprises:
displaying the captured real-world image through a first image display component of the terminal; and
displaying the skeleton animation of the animation model through a second image display component of the terminal, wherein the second image display component is superimposed on the first image display component; and
the capturing a currently displayed target real-world image and recording the skeleton animation of the animation model comprises:
capturing the currently displayed target real-world image through the first image display component, and simultaneously recording the skeleton animation of the animation model through the second image display component.

10. The terminal according to claim 9, wherein the recording the skeleton animation of the animation model through the second image display component comprises:
capturing a currently displayed skeleton animation image of the animation model at intervals of a preset time length through the second image display component to serve as a frame of image of the recorded skeleton animation.

11. The terminal according to claim 8, wherein the plurality of operations further comprise:
displaying the target real-world image and each of the plurality of image frames of the animation model on an interface through the parent image display control and the child image display control.

12. The terminal according to claim 11, wherein the plurality of operations further comprise:
in response to the photographing instruction, recording an animation offset location of the current skeleton animation of the animation model relative to the real-world image; and
the displaying the target real-world image and each of the plurality of image frames of the animation model on a corresponding interface through the parent image display control and the child image display control comprises:
setting the current offset location of the child image display control relative to the parent image display control according to the animation offset location; and
displaying the target real-world image and each of the plurality of image frames of the animation model on the corresponding interface according to the parent image display control and the child image display control after the setting.

13. The terminal according to claim 8, wherein the plurality of operations further comprise:
determining a location in an interface according to a location of the animation model and a size of the skeleton animation, and adding an information display box to the location;
displaying, in the information display box, information inputted by a user;
performing image capture on the information display box, to obtain an information display box image; and
adding the information display box image to the dynamic image.

14. The terminal according to claim 13, wherein the adding the information display box image to the dynamic image comprises:
performing image composition on the information display box image and each of the plurality of composited images, and combining obtained images into the dynamic image.

15. A non-transitory computer readable storage medium storing a plurality of machine readable instructions in connection with a terminal having one or more processors, wherein the plurality of machine readable instructions, when executed by the one or more processors, cause the terminal to perform a plurality of operations including:
displaying a skeleton animation of an animation model on a real-world image captured by the terminal;
receiving a photographing instruction;
in response to the photographing instruction:
capturing a currently displayed target real-world image and recording the skeleton animation of the animation model, the recorded skeleton animation including a plurality of image frames;
associating the target real-world image with a parent image display control and each of the plurality of image frames of the animation model with a child image display control, respectively;
performing image composition on the target real-world image and each of the plurality of image frames of the animation model according to a current offset location of the child image display control relative to the parent image display control, to obtain a plurality of composited images, each composited image having the target real-world image as its background and a corresponding image frame of the animation model; and
combining the plurality of composited images into a dynamic image animation.

16. The non-transitory computer readable storage medium according to claim 15, wherein the displaying a skeleton animation of an animation model on a real-world image captured by the terminal comprises:
- displaying the captured real-world image through a first image display component of the terminal; and
- displaying the skeleton animation of the animation model through a second image display component of the terminal, wherein the second image display component is superimposed on the first image display component; and
- the capturing a currently displayed target real-world image and recording the skeleton animation of the animation model comprises:
- capturing the currently displayed target real-world image through the first image display component, and simultaneously recording the skeleton animation of the animation model through the second image display component.

17. The non-transitory computer readable storage medium according to claim 15, wherein the plurality of operations further comprise:
- displaying the target real-world image and each of the plurality of image frames of the animation model on an interface through the parent image display control and the child image display control.

18. The non-transitory computer readable storage medium according to claim 15, wherein the plurality of operations further comprise:
- determining a location in an interface according to a location of the animation model and a size of the skeleton animation, and adding an information display box to the location;
- displaying, in the information display box, information inputted by a user;
- performing image capture on the information display box, to obtain an information display box image; and
- adding the information display box image to the dynamic image.

19. The non-transitory computer readable storage medium according to claim 18, wherein the adding the information display box image to the dynamic image comprises:
- performing image composition on the information display box image and each of the plurality of composited images, and combining obtained images into the dynamic image.

20. The non-transitory computer readable storage medium according to claim 17, wherein the plurality of operations further comprise:
- in response to the photographing instruction, recording an animation offset location of the current skeleton animation of the animation model relative to the real-world image; and
- the displaying the target real-world image and each of the plurality of image frames of the animation model on a corresponding interface through the parent image display control and the child image display control comprises:
- setting the current offset location of the child image display control relative to the parent image display control according to the animation offset location; and
- displaying the target real-world image and each of the plurality of image frames of the animation model on the corresponding interface according to the parent image display control and the child image display control after the setting.

* * * * *